G. H. LOMAX.

MOLD FOR GLASSWARE.

No. 9,904. Reissued Oct. 18, 1881.

Witnesses.

S. N. Piper.

John H. Litchfield.

Inventor.

George H. Lomax.

by R. H. Ashley atty.

UNITED STATES PATENT OFFICE.

GEORGE H. LOMAX, OF SOMERVILLE, MASSACHUSETTS.

MOLD FOR GLASSWARE.

SPECIFICATION forming part of Reissued Letters Patent No. 9,904, dated October 18, 1881.

Original No. 143,629, dated October 14, 1873. Application for reissue filed August 5, 1881.

*To all whom it may concern:*

Be it known that I, GEORGE H. LOMAX, of Somerville, of the county of Middlesex and State of Massachusetts, have invented a new and useful Improvement in Glassware-Molds, &c.; and I do hereby declare the same to be described in the following specification, reference being had to the accompanying drawings, of which—

Figure 1:
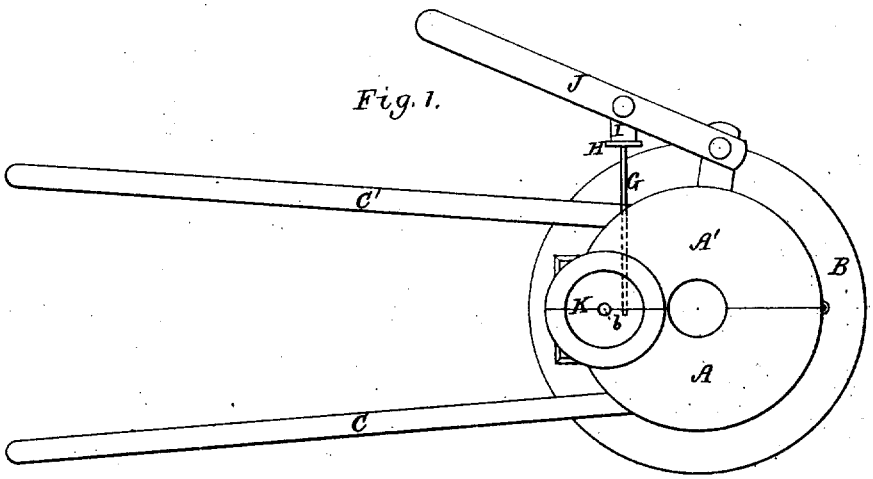
Figure 2:
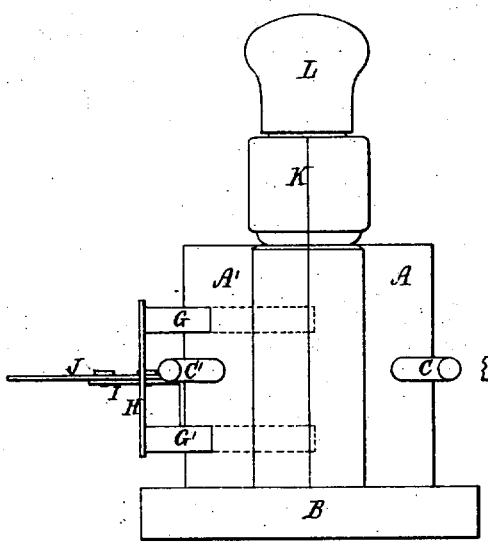

Figure 1 is a top view of all of a mold or apparatus of my invention except the press-plunger, to be described. Fig. 2 is a front elevation, and Fig. 3 a vertical section, of such apparatus with its press-plunger.

The object of my invention is to mold a handle and apply it to what is termed by glass-ware-makers a "blow-over" article; also, to blow the said article in a mold and form and apply or affix a handle to the said article while it is in the mold; and my invention consists, in part, in the combination of a handle-matrix and a press, essentially as hereinafter described, with a mold or device for holding against the said matrix the glass article, so that molten glass may be forced into the matrix and against the glass article and become connected thereto and constitute a handle therefor.

In using my apparatus the article of glass-ware may be molded or formed in the mold, and subsequently have the handle applied to it.

In the drawings, A A′ denote the two halves or main parts of the mold, they being hinged together and mounted upon a base, E, in the ordinary manner.

C C′ are handles extending from such parts A A′, and for aiding in opening and closing them.

D represents one half of the matrix for forming the body of the article, the other half corresponding with such part D, with the exception of the gates thereof.

Within the shell of the mold is the handle-forming matrix E, one half of such matrix being formed in each half of the mold, and opening into the main matrix by two mouths, *a a′*, provided, respectively, with gates G G′, by which communication between the handle-matrix and the body-matrix may be cut off as occasion may require. These gates extend transversely through one half of the mold, and are connected to an upright bar, H, which, by means of an arm, I, is pivoted to a lever, J, by which the gates may be moved either to open or close communication between the matrices, as may be desirable.

Figure 3:
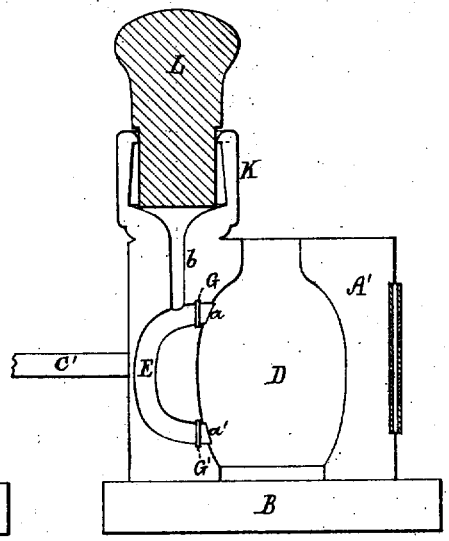

K is an auxiliary font or glass-receiving chamber, mounted upon the top of the mold, such font communicating by a channel, *b*, with the handle-forming matrix, as shown in Fig. 3. The chamber K is provided with a plunger or presser, L, by which the molten glass, after having been poured into the chamber, can be pressed through the passage *b* into the handle-forming matrix, in order to fill such and form a handle and cause the ends of such handle to so impinge against the heated glass article in the body-matrix as to be firmly affixed to it, (the said article.) This employment of the presser or plunger insures not only the formation of the handle, but a strong and positive fixation of it to the body portion of the article of glassware.

Having described the mechanism for forming a glass article and its handle and fixing them to each other, the method or process of using such is as follows: The gates G G′ are first to be closed, in order to interrupt communication between the body-matrix and the handle-matrix. The glass-blower having collected on the end of his rod or blow-pipe a sufficient quantity of molten glass to form the body of the article, and having manipulated and treated it in the ordinary manner, places it in the body-matrix and closes together the several parts of the mold. This having been effected, he next inflates the glass, so as to cause it to fill the body-matrix and form therein the body portion of the article. Having done this, he opens the gates and pours into the font or press-chamber a sufficient quantity of glass in a molten state to form the handle of the article, and he puts the plunger into the press-chamber and forces the glass thereof into the handle-forming matrix, the end portions of the handle being by such firmly pressed into contact with the outer surface of the article in the body-matrix, a strong union of the handle and body being thus produced.

Having thus described my invention, what I claim as such is as follows, viz:

1. The combination of the handle-forming matrix, and its press, with a device for holding or supporting against the said matrix a vessel or article of glassware, while a handle is being formed, in the said matrix and against the said vessel or article, by means of the matrix and the press, substantially as set forth.

2. The combination of the handle-matrix, and its gates and press, with a device for holding or supporting against the matrix a vessel or article of glassware while a handle is being formed, in the matrix and against the said vessel or article, by means of the matrix and the press, substantially as set forth.

3. The process of molding a handle of glass, and fixing it to an article of glassware, such consisting in confining the article in a holder or mold, and against a handle-forming matrix, and by means of a press, as described, forcing glass, in a molten state, into the said matrix, and against the glass article held thereto, all being substantially as set forth.

4. Blowing a vessel or article of glassware in and forming it by a mold and by means of a handle-matrix, and a press, as set forth, and while the said article is in a sufficiently-heated state, molding a handle from molten glass, within said matrix, and forcing such handle therein, against the blown and heated article in the mold, so as to cause the handle and article of glass to combine with or to be connected to each other, as described.

5. The combination of the handle-forming matrix, and its press, with a mold for molding, in manner as described, the body of an article of glassware, and holding it against the handle-forming matrix, in order that a handle, while being made in such matrix, may be forced into contact with and united to the said body, all being substantially as set forth.

GEORGE H. LOMAX.

Witnesses:
R. H. EDDY,
E. B. PRATT.